(12) United States Patent
Thuneguntla et al.

(10) Patent No.: US 12,069,063 B1
(45) Date of Patent: Aug. 20, 2024

(54) FINE GRAINED ACCESS CONTROL IN A DATA LAKE USING LEAST PRIVILEGE ACCESS

(71) Applicant: INTUIT INC., Mountain View, CA (US)

(72) Inventors: Saikiran Sri Thunuguntla, Bangalore (IN); Raman Gupta, Bangalore (IN); Senthil Kumar LS, Bangalore (IN); Anishkumar SS, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/326,896

(22) Filed: May 31, 2023

(51) Int. Cl.
*H04L 9/40* (2022.01)
*G06F 21/62* (2013.01)

(52) U.S. Cl.
CPC ........ *H04L 63/105* (2013.01); *G06F 21/6218* (2013.01); *H04L 63/20* (2013.01)

(58) Field of Classification Search
CPC .... H04L 63/105; H04L 63/20; G06F 21/6218
See application file for complete search history.

(56) References Cited

U.S. PATENT DOCUMENTS

| | | | |
|---|---|---|---|
| 8,978,114 B1* | 3/2015 | Kaushik | G06N 3/08 726/4 |
| 9,235,412 B1* | 1/2016 | Cohen | G06F 8/75 |
| 9,471,797 B1* | 10/2016 | Biller | G06F 21/604 |
| 10,122,757 B1* | 11/2018 | Kruse | H04L 63/10 |
| 10,250,612 B1* | 4/2019 | Raposa | H04L 63/108 |
| 10,938,828 B1* | 3/2021 | Badawy | G06F 21/604 |
| 2002/0026592 A1* | 2/2002 | Gavrila | G06F 21/6218 709/229 |
| 2014/0188548 A1* | 7/2014 | Long | G06F 21/554 705/7.28 |
| 2014/0215604 A1* | 7/2014 | Giblin | G06F 21/6218 726/21 |
| 2015/0227591 A1* | 8/2015 | Jose | G06F 16/285 707/777 |
| 2016/0269371 A1* | 9/2016 | Coimbatore | H04L 63/20 |
| 2018/0152478 A1* | 5/2018 | Zhou | H04L 63/10 |
| 2019/0362087 A1* | 11/2019 | Ferrans | H04L 63/102 |
| 2019/0364051 A1* | 11/2019 | Ferrans | G06F 16/9024 |
| 2020/0106781 A1* | 4/2020 | Li | G06F 17/15 |
| 2020/0120098 A1* | 4/2020 | Berg | H04L 63/104 |
| 2021/0357491 A1* | 11/2021 | Teller | H04W 12/33 |
| 2023/0086475 A1* | 3/2023 | Mosko | H04L 63/20 726/1 |
| 2023/0142344 A1* | 5/2023 | Nakar | G06F 21/6218 726/26 |

* cited by examiner

Primary Examiner — Jason Chiang
(74) Attorney, Agent, or Firm — DLA PIPER LLP (US)

(57) ABSTRACT

An access graph is constructed based on access policy data from user accounts, data lake buckets, and/or access policy statements from any other location. Access logs are analyzed to determine actual access to the data tables. For a given user role, an initial set of data tables that are actually accessed is generated forming the baseline of data tables for which access privileges are to be maintained. User roles that are similar to the given user role are identified and additional data tables accessed by the similar user roles are added to the initial set of data tables to generate a final set of data tables. Access privileges to the final set of data tables are maintained for the given user role, while access privileges to the remaining data tables may be revoked.

18 Claims, 8 Drawing Sheets

FINE GRAINED ACCESS CONTROL IN A DATA LAKE USING LEAST PRIVILEGE ACCESS

CROSS REFERENCE TO RELATED APPLICATION

This application is related to U.S. application Ser. No. 18/326,889, filed May 31, 2023, entitled "Generating Observability Metrics for Data Lake Usage Based on Data Layer Activity Logs," which has been incorporated by reference in its entirety.

BACKGROUND

Modern day analytics and machine learning models use and process a vast amount of data. The data is generally stored in data lakes, typically in an online analytical processing (OLAP) format. In a data lake, the data is stored in multiple buckets where each bucket has multiple data tables stored as hive tables The data lakes are hosted by cloud providers such as Amazon web services (AWS), Microsoft Azure, etc. An example bucket provided by AWS includes simple storage service (S3) bucket.

The data lake is accessed by multiple users within an organization. In a typical use case, users are assigned user accounts (e.g., AWS accounts). Each user account may be associated with a corresponding plurality of buckets that host different accounts. Access management for the hive tables may be defined in a bucket policy, which controls the users that can access the corresponding buckets, and/or an Identity and Access Management (IAM) policy, which assigns different roles (with concomitant access privileges structure) for corresponding user accounts. Therefore, the overall access to the tables in the data lake is controlled by a combination of policies defined from the perspective of the data layer (e.g., bucket policy) and from the perspective of the user roles.

It is generally more practical to design and implement a liberal access policy structure, also known as a "course-grained" policy. A "course-grained" policy tends to be least disruptive—a user role (associated with a user account) that wants to access a hive table will typically get access to that S3 bucket. A course-grained policy is simpler—therefore easier—from a technical point of view. Wider access will necessarily have a lesser number of constraints to be defined and implemented. For instance, a user role can simply be given a blanket access to a plurality of buckets, so that the associated user account can retrieve, edit, and update any of the hive tables in the buckets as desired.

This technical simplicity, however, comes at the expense of security. It is generally a violation of security best practices to have a "free-for-all" liberal access regime. If a user account is compromised by a nefarious external actor, the integrity and security of a larger swath of the data lake may be compromised. The damage radius of an insider threat also becomes unnecessarily large.

One extreme solution to this technical challenge is to start from scratch: close the data lake for all user accounts and user roles and then painstakingly define the access policies from the ground up. This solution is not feasible for at least a few reasons. First, it will create a significant disruption in the operation of a functioning complex organization, which has to constantly cater to the data needs of its internal users and its outside customers. Second, it is difficult to define a priori what access privileges will be required for different user roles.

Therefore, a significant improvement in access control with minimum amount of disruption within a data lake environment is desired.

SUMMARY

Embodiments disclosed herein solve the aforementioned technical problems and may provide other solutions as well. One or more embodiments define a fine-grained access control scheme based on existing access privileges, actual access, and similarity between user roles (e.g., an IAM role). An access graph is constructed based on access policy data from user accounts, data lake buckets, and/or access policy statements from any other location. The access graph provides a picture of current access privileges (i.e., coarse-grained) from different user roles to different data tables in the buckets. Access logs are analyzed to determine actual access to the data tables. For a given user role, an initial set of data tables that are actually accessed is generated, forming the baseline of data tables for which access privileges are to be maintained. User roles that are similar to the given user role are identified and additional data tables accessed by the similar user roles are added to the initial set of data tables to generate a final set of data tables. Access privileges to the final set of data tables are maintained for the given user role, while access privileges to the remaining data tables may be revoked. Therefore, the user role may be provided fined-grained access privileges to the data tables that are actually used by the user role-thereby satisfying the principle of least privilege access.

In one or more embodiments, a method is provided. The method may include generating an access graph based on current access policies, the access graph indicating current access privileges between a plurality of user roles and a plurality of data tables. The method may further include for a first user role having current access privileges to a set of data tables of the plurality of data tables: analyzing access logs to the set of data tables to determine a first subset of data tables that were accessed by a user account using the first user role; identifying a predetermined number of additional user roles that have accessed at least a portion of the first subset of data tables; generating a second subset of data tables comprising the first subset of data tables and additional data tables accessed by the predetermined number of additional user roles; and maintaining access privileges of the first user role to the second subset of data tables, while modifying access privileges of the first user role to data tables of the plurality of data tables that are not included in the second set of data tables.

In one or more embodiments, a system is provided. The system may include a non-transitory storage medium storing computer program instructions and a processor configured to execute the computer program instructions to cause operations. The operations may include generating an access graph based on current access policies, the access graph indicating current access privileges between a plurality of user roles and a plurality of data tables. The operations may further include for a first user role having current access privileges to a set of data tables of the plurality of data tables: analyzing access logs to the set of data tables to determine a first subset of data tables that were accessed by a user account using the first user role; identifying a predetermined number of additional user roles that have accessed at least a portion of the first subset of data tables; generating a second subset of data tables comprising the first subset of data tables and additional data tables accessed by the predetermined number of additional user roles; and maintaining access privileges of the first user role to the second subset of data tables, while modifying access privileges of the first user role to data tables of the plurality of data tables that are not included in the second set of data tables.

DETAILED DESCRIPTION OF SEVERAL EMBODIMENTS

Embodiments disclosed herein may provide fine-grained access to different data tables in a data lake based on the principle of least privilege access. That is, the fine-grained access may be based on the actual usage (e.g., access) of the data tables by different user roles (e.g., IAM roles). The fine-grained access, however, is not confined to the data tables that are actually accessed. Embodiments disclosed herein identify additional data tables based on the similarity between a given user role and other user roles. Therefore, a user role will retain access privileges to the data tables that it has actually accessed and additional data tables that have been accessed by similar user roles. Therefore, the fine-grained approach may generate minimum amount of disruption when access privileges to the remaining data tables are revoked.

Figure 1:
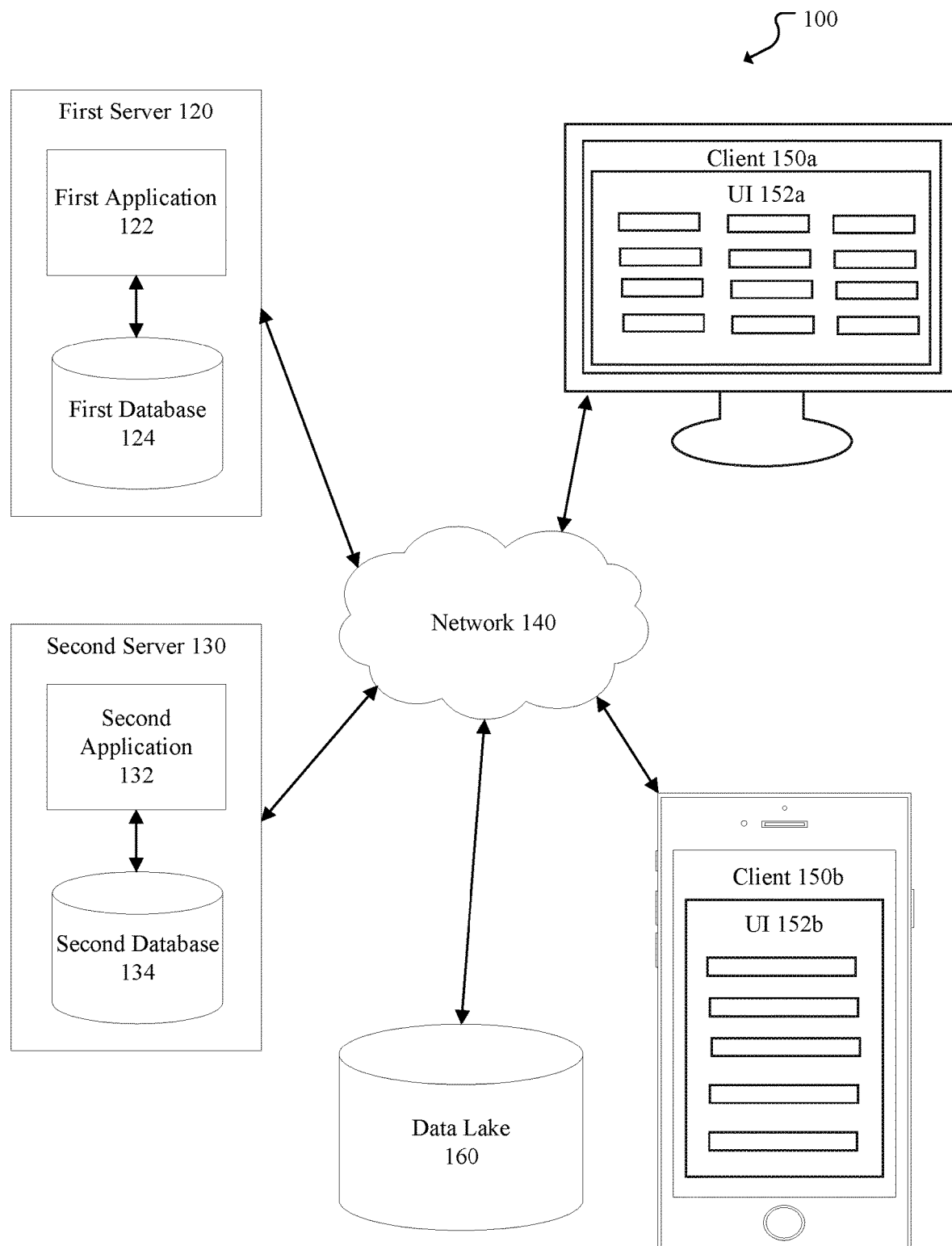
FIG. 1 shows an example of a system configured for fine-grained access control for a data lake, based on the principles disclosed herein.

FIG. 1 shows an example of a system 100 configured for fine-grained access control for a data lake, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively referred to herein as "client devices 150"), servers 120, 130, and a data lake 160 interconnected by a network 140. The first server 120 hosts a first server application 122 and a first database 124 and the second server 130 hosts a second server application 132 and a second database 134. The client devices 150a, 150b have user interfaces 152a, 152b, respectively, (collectively referred to herein as "user interfaces (UIs) 152"), which may be used to communicate with the server applications 122, 132 and the data lake 160 using the network 140.

The data lake 160 includes a database maintained by a cloud service provider. For example, the data lake 160 includes AWS S3 storage storing a plurality of data tables as hive tables in a plurality of buckets. The server applications 122, 132 access the data lake 160 to perform various analytic operations on the data tables stored thereon. Additionally, the server applications 122, 132 may perform the embodiments of controlling access to the data lake 160 utilizing a fine-grained approach, as described throughout this disclosure.

The server applications 122, 132 use corresponding databases 124, 134 to store data such as the access privilege data, observability metrics, summary tables, and/or any other type of data generated during the course of implementing the embodiments disclosed herein.

Communication between the different components of the system 100 is facilitated by one or more application programming interfaces (APIs). APIs of system 100 may be proprietary and or may include such APIs as AWS APIs or the like. The network 140 may be the Internet and or other public or private networks or combinations thereof. The network 140 therefore should be understood to include any type of circuit switching network, packet switching network, or a combination thereof. Non-limiting examples of the network 140 may include a local area network (LAN), metropolitan area network (MAN), wide area network (WAN), and the like.

Client devices 150 may include any device configured to present user interfaces (UIs) 152 and receive user inputs, e.g., admin user inputs. The UIs 152 are generally graphical user interfaces (GUIs). For example, an admin user may use the UIs to provide configuration parameters, provide commands to implement the embodiments disclosed herein. Additionally, the UIs 152 can show the reports (e.g., tabular reports in Excel) generated by the server applications 122, 132.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and or second server 130. A single user may have multiple client devices 150, and or there may be multiple users each having their own client devices 150.

Furthermore, it should be understood that the server applications 122, 132 running on the servers 120, 130, and the databases 124, 134 being hosted by the servers 120, 130 is just an example, and should not be considered limiting. Different portions of the server applications 122, 132 and, in one or more embodiments, the entirety of the server applications 122, 132 can be stored in the client devices 150. Similarly, different portions or even the entirety of the databases 124, 134 can be stored in the client devices 150. Therefore, the functionality described throughout this disclosure can be implemented at any portion of the system 100.

Figure 2:
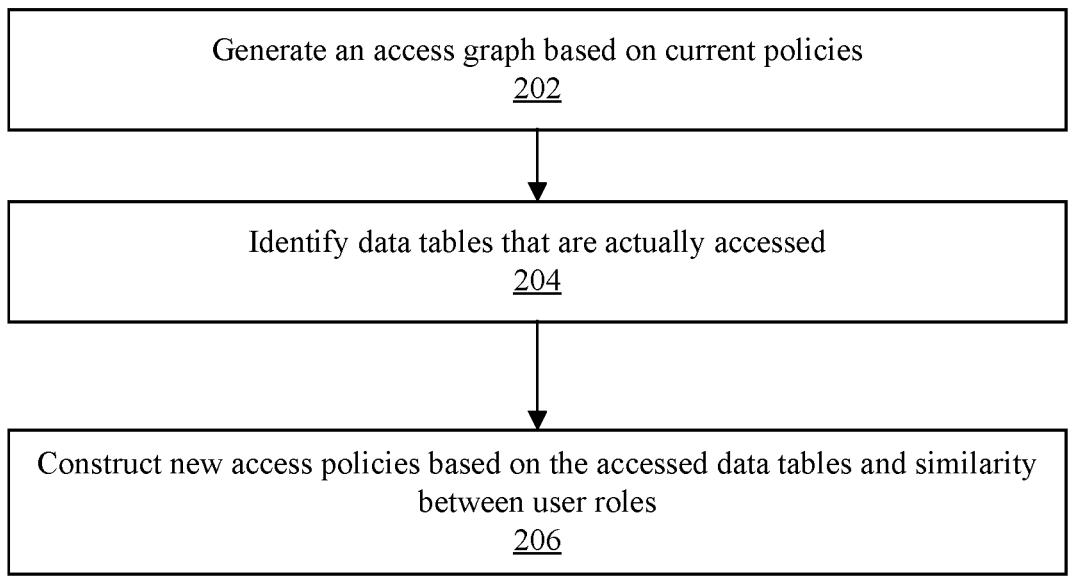
FIG. 2 shows a flow diagram of an example method based on the principles disclosed herein.

FIG. 2 shows a flow diagram of an example method 200 based on the principles disclosed herein. It should, however, be understood that the steps of the method 200 are provided as examples and should not be considered limiting. Therefore, methods with alternative, additional, or fewer number of steps should be considered within the scope of this disclosure. The steps of the method 200 may be performed by any combination of components of the system 100 shown in FIG. 1.

Figure 3:
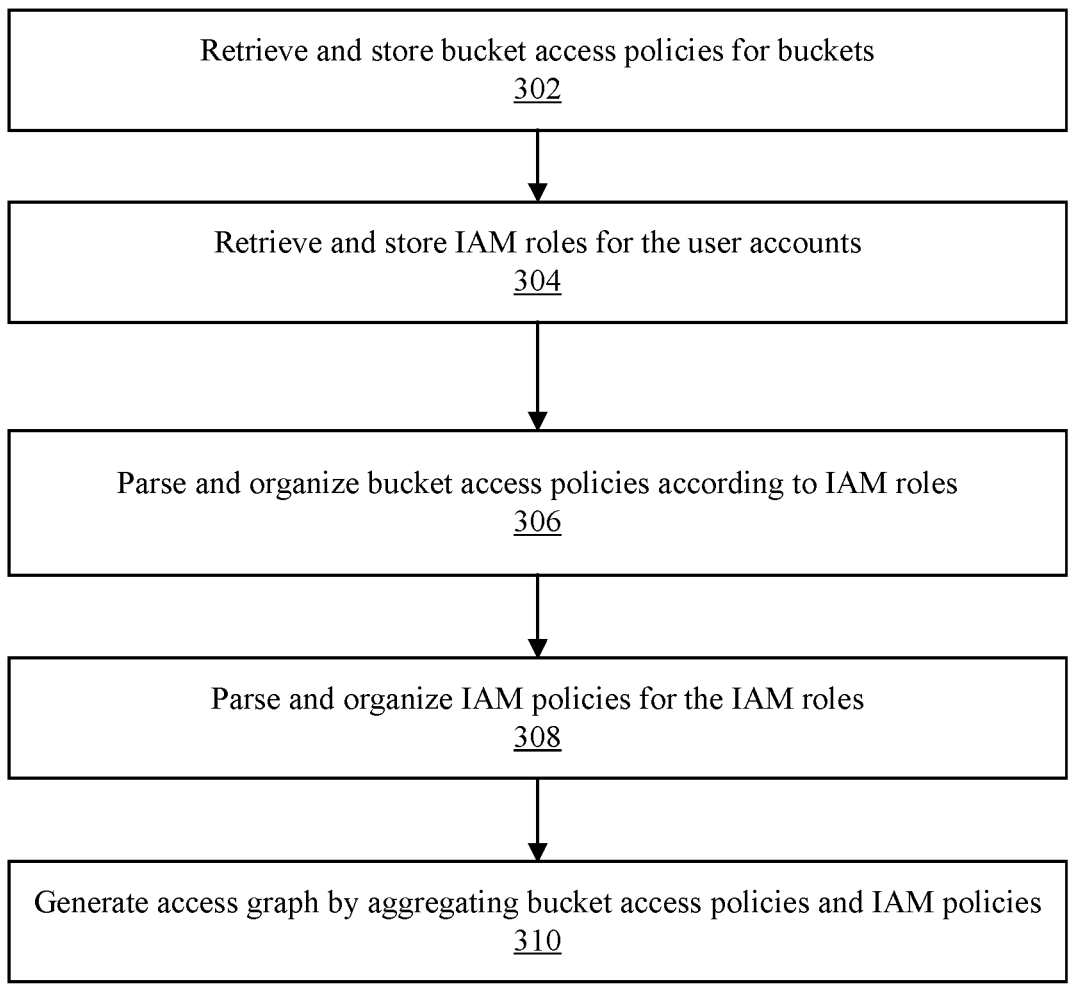
FIG. 3 shows an example method of generating an access graph based on the principles disclosed herein.

Particularly, the method 200 illustrates three high level steps to constructing access polices based on the least privilege access principle to provide fine-grained access starting from the current policies of coarse-grained access. At step 202, an access graph based on the current policies may be generated. The access graph will illustrate coarse-grained access privileges as provided by the current policies. Details of generating the access graph are shown in FIG. 3, 4 and discussed below in more detail. At step 204, data tables that are actually accessed may be identified. In one or more embodiments, data table access logs are analyzed to determined what data tables were accessed by the different nodes in the access graph. The actual access information may help to significantly prune the access graph by generating a subset of data tables that were actually accessed from a larger set of data tables that are accessible. Details of identifying data tables that were actually accessed are discussed below in reference to FIG. 5 (discussed below) and in U.S. patent application Ser. No. 18/326,889, which has been incorporated by reference in its entirety. At step 206, new access policies (with new access privileges) may be constructed based on the similarity of accessed data tables between user roles (e.g., IAM roles). The accessed data tables generally provide a baseline—the minimum level of access that is to be provided. Similar user roles are identified by using, for example, Pearson correlation, Jaccards similarly, collaborative machine learning models, etc. This approach improves upon the baseline by providing a broader access to other data tables that similar IAM roles have actually accessed. Details of constructing new policies are discussed below in reference to FIGS. 6-7.

FIG. 3 shows an example method 300 of generating an access graph based on the principles disclosed herein. It should, however, be understood that the steps of the method 300 are provided as examples and should not be considered limiting. Therefore, methods with alternative, additional, or fewer number of steps should be considered within the scope of this disclosure. The steps of the method 300 may be performed by any combination of components of the system 100 shown in FIG. 1.

The access graph generated by the method 300 depicts the current state of access privileges for a data lake. Particularly, the access graph can provide the following information: (i) for a given user account, what IAM roles that the user account has access to, (ii) given an IAM role, how many data tables that the IAM role has access to (e.g., according to IAM policies), and (iii) given a data table, what IAM roles can access the data table. That is, the access graph can provide information from the perspective of the user account (e.g., the data tables that a user account can access) and from the perspective of the data table (the user accounts that can access a data table). Generally, the goal of the access graph is to provide a picture of what access privileges the coarse-grained paradigm provides, before improving upon it to move toward the fine-grained approach based on the principles disclosed herein. Because of the complexity of user accounts, IAM roles and attached IAM policies, and a plethora of data tables, one having ordinary skill in the art will understand that generating the access graph itself is a non-trivial process and is not a conventional collection and aggregation of data.

The method 300 begins at step 302 where bucket access policies are retrieved and stored. The buckets are generally associated with one or more user accounts, where the user accounts have different IAM roles vis-à-vis the buckets. The bucket access policies generally provide what data tables within a given bucket can be accessed by the IAM roles (the access policy is also augmented by the IAM policies associated with the IAM roles). For instance, in the context of AWS accounts, AWS metadata service (MDS) API may be called for each bucket to retrieve the bucket access policies and store the retrieved policies locally and/or in the data lake itself. Step 302 may be performed for all the existing user accounts.

At step 304, IAM roles for the user accounts may be retrieved and stored. In the context of AWS accounts, the MDS API may be used to retrieve the IAM roles. For example, the IAM roles can be retrieved from the bucket policies retrieved in step 302. To increase the probability of capturing all of the IAM roles, if there is a root access to a bucket is given to the user account, all IAM roles from that account are retrieved. Additionally, for each bucket policy, if there are IAM roles defined for different accounts, these IAM roles are retrieved as well. Generally, the different IAM roles are collected for the user accounts and the IAM policies (e.g., polices that are attached to and enforcing the access privileges of the IAM roles) are collected too. The IAM roles and policies are stored locally and/or in the data lake itself.

At step 306, the bucket access policies may be parsed and organized according to IAM roles. Particularly, stored bucket access policies may be retrieved and parsed to identify the different bucket access policies assigned to different IAM roles. As an example, a bucket access policy for an IAM role may include: (i) allowing access to all of the data tables in a given bucket, (ii) denying access to all of the data tables in the bucket, or (iii) allowing access to a specific data table in the bucket. Step 306 therefore creates a mapping of access privileges between different IAM roles and the different bucket access policies.

At step 308, IAM policies are parsed and organized for the IAM roles. The IAM policies are attached to IAM roles to enforce the corresponding IAM policies (i.e., access privileges for the IAM roles). For example, the IAM policies define different actions that may be taken by the particular IAM role (e.g., having read access to a data table but not having write access to it). In one or more embodiments, an IAM policy does not include an action (e.g., does not define any access policy), and can be safely ignored. For the IAM policies with actions, all of the buckets and the data tables that the IAM policy has access to are gathered.

It should, however, be understood that steps 302, 304, 306, and 308 are just examples for retrieving and organizing the current access state through different data sources and should not be considered limiting. The access data can be collected from any of compute layers and data layers. For example, access policy statements—regardless of where they are stored—can be analyzed to determine different IAM roles for a user account and what IAM polices are associated with the IAM roles.

At step 310, the access graph is generated by aggregating bucket access policies and IAM policies. That is, the access graph can be based on a mathematical union between bucket access policies according to IAM roles (generated in step 306) and the IAM policies from the IAM roles (generated in step 308). As described above, the access graph provides a current state of access privileges as determined by current access policies (e.g., based on the coarse-grained access regime). The access graph therefore becomes a point a departure for implementing fine-gained access based on the principles disclosed herein.

The interaction between user accounts, IAM roles, IAM policies, and bucket policies makes the access graph very complex with a plethora of nodes and edges. An example portion of an illustrative access graph are now described with respect to FIG. 4

Figure 4:
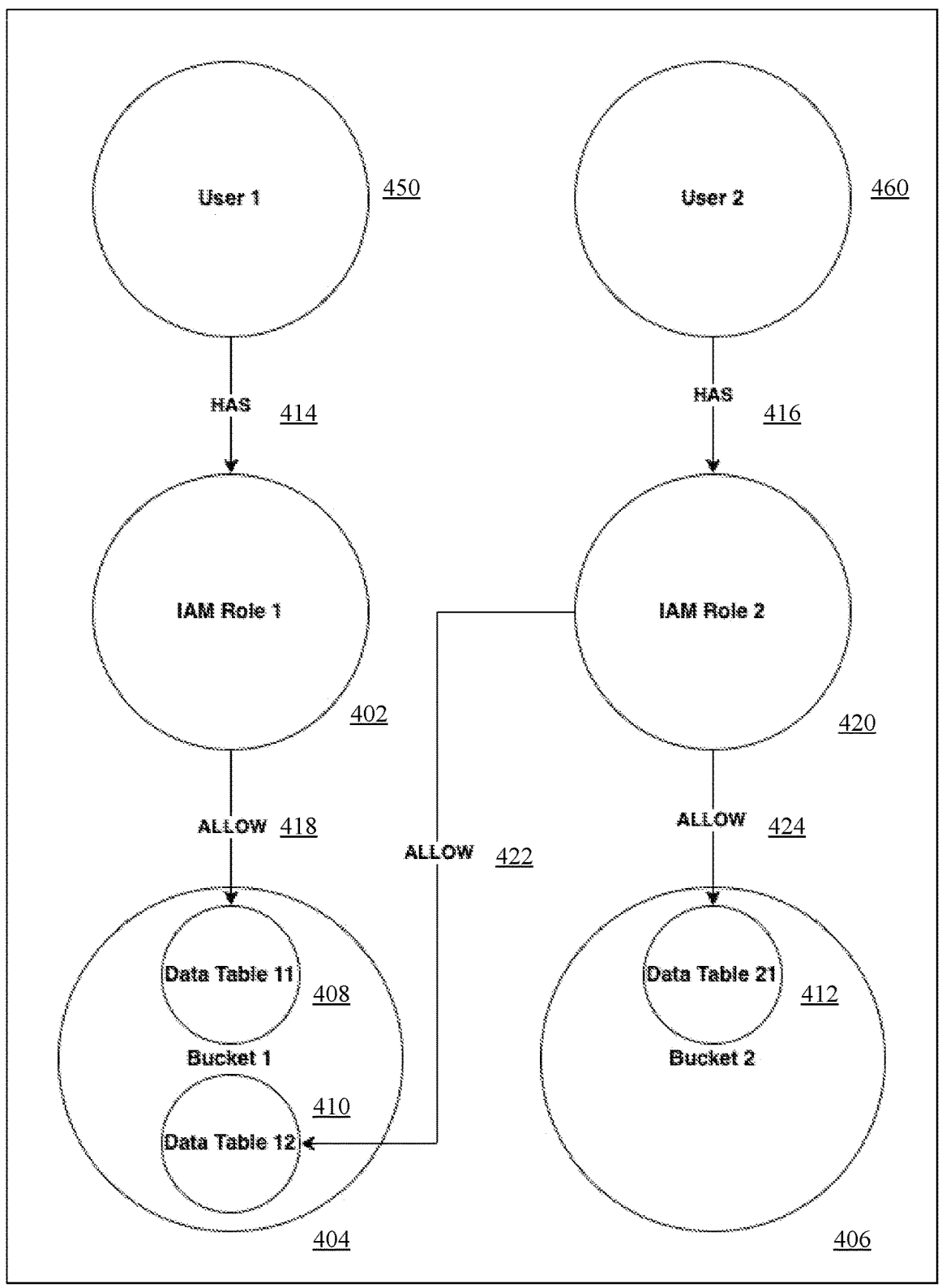
FIG. 4 shows an access graph based on the principles disclosed herein.

FIG. 4 shows a portion 400 of an access graph based on the principles disclosed herein. The portion 400 particularly shows user 1 (node 450)—e.g., represented by a corresponding user account—having an IAM role 1 (node 402), as indicated by edge 414 ("HAS"), that allows access, as indicated by edge 418 ("ALLOW") to data table 11 (node 408) within bucket 1 (node 404). The portion 400 also shows user 2 (node 460)—e.g., also represented by a corresponding user account—having an IAM role 2 (node 420), as indicated by edge 416 ("HAS"), that allows access to: (i) as indicated by node 424 ("ALLOW") to data table 21 (node 412) within bucket 2 (node 406), and (ii) as indicated by node 422 ("ALLOW") to data table 12 (node 410) within bucket 1 (node 404).

While FIG. 4 shows that an IAM role (that is, assumed by a user) can have access privileges to multiple data tables across multiple buckets, a data table may be accessed by multiple IAM roles. In other words, the access graph may have a one-to-many relationship between the IAM roles and data tables and a one-to-many relationship between the data tables and the IAM roles, thereby forming bidirectional many-to-many relationships. Therefor, the shown portion 400 is just for an illustration of the principle, and any type of access graph with complex connections between the users, IAM roles, buckets, and data tables should be considered within the scope of this disclosure.

After construction of the access graph, the next process is to determine which data tables are actually accessed by the different user accounts. The actual access may be determined by generating observability metrics based on access logs. Details of generating the observability metrics are described in the U.S. patent application Ser. No. 18/326,889. A basic description of generating the observability metrics is provided herein.

Figure 5:
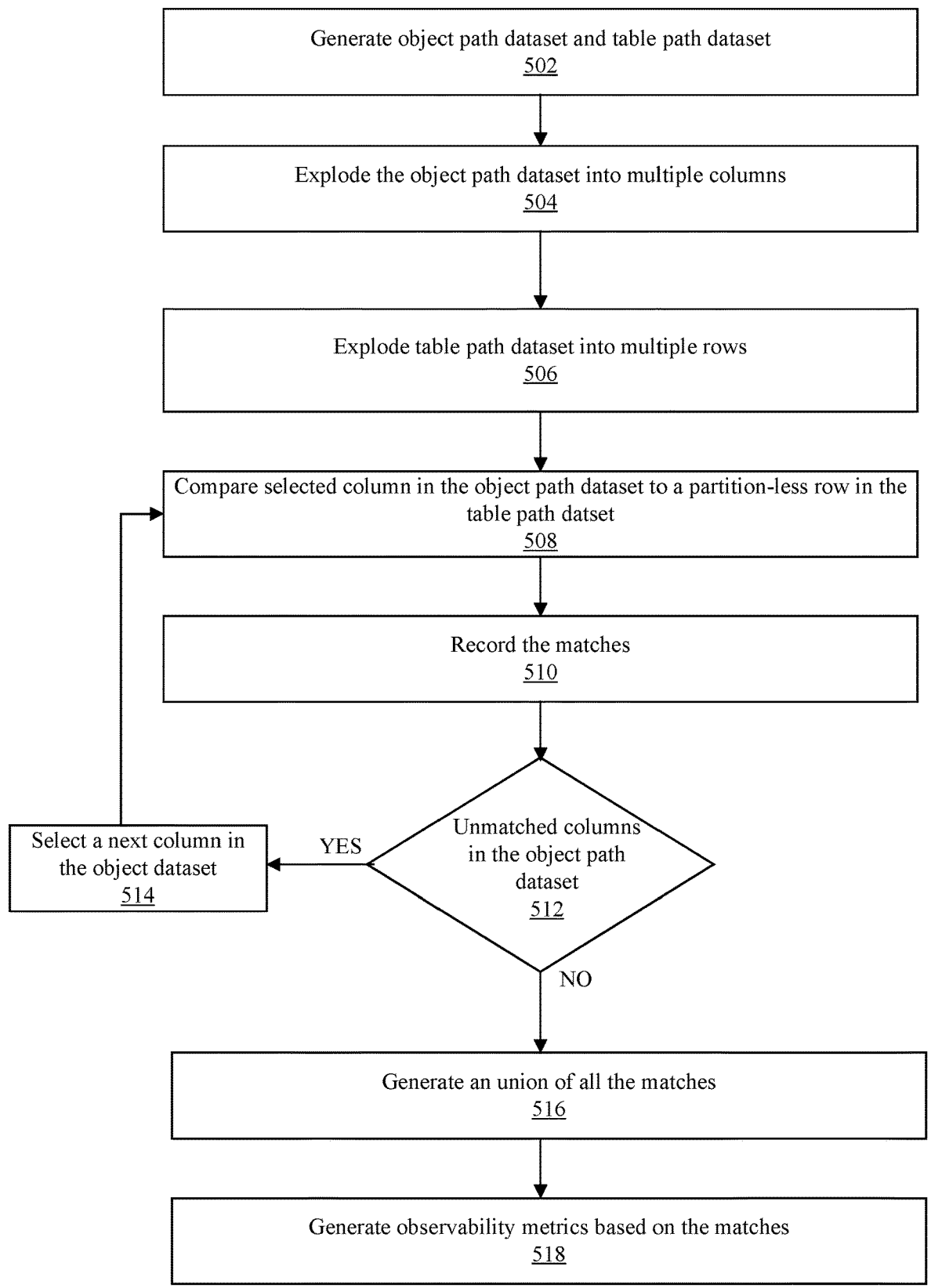
FIG. 5 shows a flow diagram of an example method of generating observability metrics based on the principles disclosed herein.

FIG. 5 shows a flow diagram of an example method 500 of generating observability metrics based on the principles disclosed herein. It should, however, be understood that the steps of the method 500 are provided as examples and should not be considered limiting. Therefore, methods with alternative, additional, or fewer number of steps should be considered within the scope of this disclosure. The steps of the method 500 may be performed by any combination of components of the system 100 shown in FIG. 1.

The method 500 begins at step 502 where an object path dataset (indicating access path to data tables) and a table path dataset (indicating physical locations of the data tables) are generated. The object path dataset may be generated based on cloudtrail logs having records of data access in the data lake by a user account in the system. The data access may be from different computation points in the system, and such access may be recorded on the cloudtrail logs (generally stored as parquet files). The fields within the object path dataset may include an object path, i.e., the pathway of access to a particular data table within the cloud. Additional fields may include an account identification (account id), IAM role for access, a flag for whether the access performed read or write operation, timestamp, etc. The table path dataset may include the data table names and their physical path in the data lake.

In one or more embodiments, the datasets are generated by filtering out extraneous data. In an example use case for AWS, cloudtrail logs involving only S3 access may be used on the object path dataset. Furthermore, only those buckets that have the data tables organized as hive tables are considered. Such filtration significantly reduces the compute and storage load when executing the method 500, which is one advantage provided by the disclosed principles.

At step 504, the object path dataset may be exploded (also referred to as expanded) into multiple columns. The multiple columns are generated by progressively removing strings from the object path to generate an expanded object path dataset. That is, within the expanded object path dataset, a first column has the original object path, a second column to the right of the first column will have a truncated object path with a portion of the string (e.g., on the right) being stripped away, a third column to the right of the second column will have a further truncated object path with an additional portion of the string (e.g., on the right) being stripped away, and so on. This progressive stripping of the string progressively generalizes the object path to be compared with other table paths.

At step 506, the table path dataset may be exploded (or expanded) into multiple rows. For example, a table path may have partition information, which may be transitory. For example, the partition information in the table dataset may be newer than the partition information in the object dataset, which generally may be a day old. Therefore, a row explosion to generalize table path by removing the partition information may increase a likelihood of a match between the object path dataset and the table path dataset.

At step 508, a selected column in the object dataset may be compared to an original row and a partition-less row in the table dataset. The comparison may begin from a column having specific object paths. For example, at the initial stage, the original column may be compared against both the original rows and the partition-less rows, e.g., the rows in the table path dataset. At step 510, the matches may be recorded. For example, an initial iteration may yield a 10% match, i.e., 10% of the rows in the object path dataset matched corresponding partition-less rows in the table path dataset.

At step 512, it is determined whether there are unmatched columns in the object path dataset. If there are unmatched columns, the execution moves to step 514 where a next column in the object path dataset may be selected for comparison. The selection of the next column where some specificity of the object path is stripped away may allow a comparison to a higher level of generality. The iteration of steps 508, 510, 512, 514 is repeated until there are no columns to be matched on the object path dataset (i.e., comparisons for all the columns in the object path dataset have been made).

At step 516, a union of all of the matches may be generated. At step 518, observability metrics are generated based on the matches. The observability metrics may indicate the actual usage of the data tables. That is, from the accessibility graph generated by method 300, the observability metrics generated by method 500 indicate the data tables that were actually accessed by the user accounts.

The observability metrics may therefore form the baseline for the principle of least privilege access. That is, for a give user account, the observability metrics identify the data tables that are actually required by the user account. For example, if the access graph shows that the user account can access 1000 data tables, the observability metrics can show that the user account accesses only 50 out of the 1000 data tables.

However, restricting the user account to the 50 data tables (or generally any number of data tables that are actually accessed) has the potential to cause disruption. For example, the user account can access other data tables occasionally and a strict restriction would disrupt this occasional access. One or more embodiments disclosed herein, however, identify additional data tables that may potentially be accessed by the user account by using collaborative machine learning models.

Figure 6:
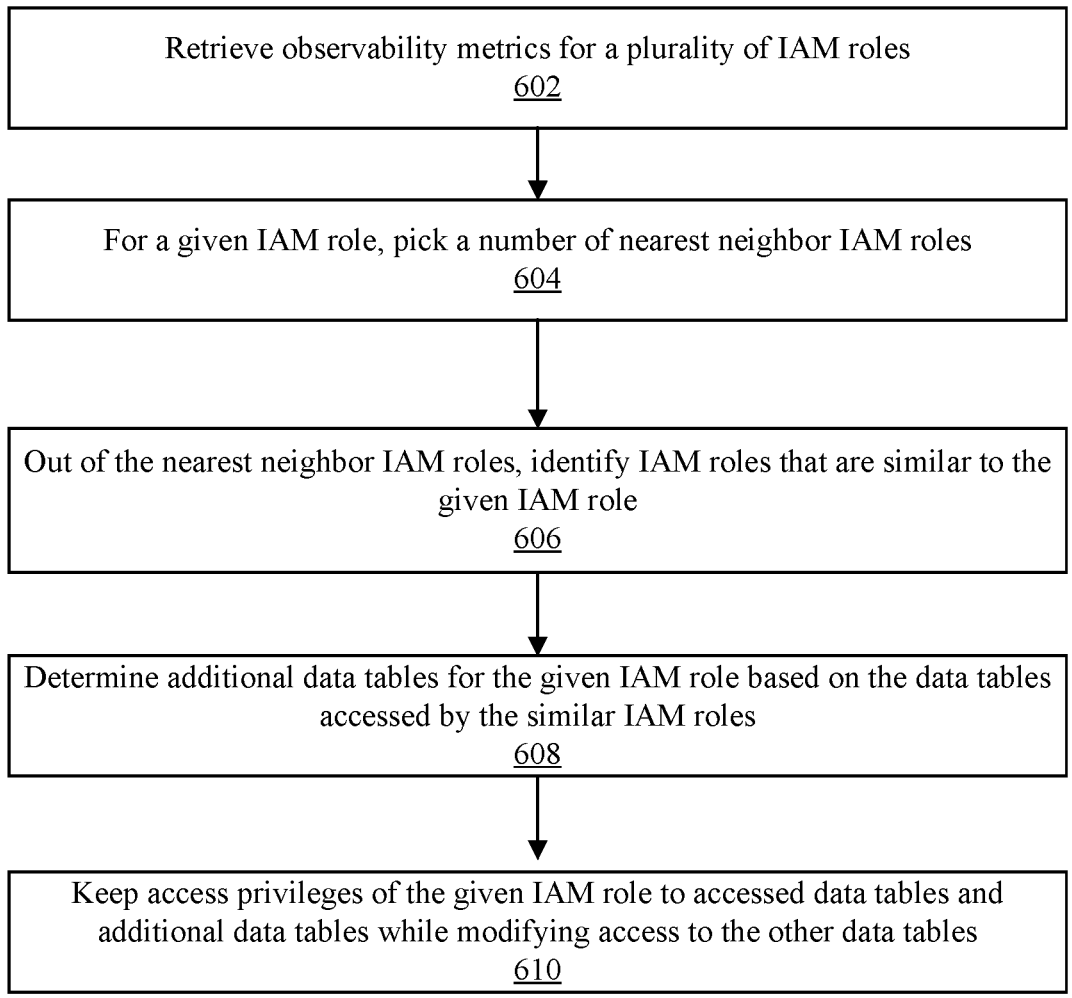
FIG. 6 shows a flow diagram of an example method of identifying additional data tables that may continue to be accessed based on the principles disclosed herein.

FIG. 6 shows a flow diagram of an example method 600 of identifying additional data tables that may continue to be accessed based on the principles disclosed herein. It should, however, be understood that the steps of the method 600 are provided as examples and should not be considered limiting. Therefore, methods with alternative, additional, or fewer number of steps should be considered within the scope of this disclosure. The steps of the method 600 may be performed by any combination of components of the system 100 shown in FIG. 1.

The method begins at step 602 where observability metrics for a plurality of IAM roles are retrieved. The observability metrics identify the data tables that were actually accessed by the IAM roles (associated with the user accounts). For explanation purposes only, it should be presumed that there are three IAM roles: iam_role1, iam_role2, and iam_role3, and an access graph showing that each of these IAM roles have access privileges to 1000 data tables. In the current example, however, the observability metrics show that iam_role1 has accessed 50 data tables, iam_role2 has accessed 60 data tables, and iam_role3 has accessed 70 data tables. There may be some overlap between the data tables accessed by the different IAM roles, but the data tables may not be exactly overlapping.

At step 604, for a given IAM role, a number of nearest neighbor IAM roles may be picked. For example, for iam_role1, 10 nearest neighbor IAM roles may be picked, and the 10 nearest neighbor IAM roles may include iam_role2 and iam_role3. Each of the 10 nearest neighbor IAM roles may have a combination of overlapping data tables and non-overlapping data tables with iam_role1.

At step 606, out of the nearest neighbor IAM roles, IAM roles that are similar to the given IAM role may be identified. In one or more embodiments the similarity between the IAM roles may be determined by a Pearson correlation or Jaccards similarity. For example, a vector is constructed for each IAM role, where the vector is based on when a given data table is accessed by the IAM role (i.e., accessed by a user account corresponding to the IAM role). The vector includes scores based on how recent the corresponding data table was accessed by the IAM role. For example, if the data table was accessed within last one week, the score can be 10. Lower scores are provided for less recent accesses. For example, a time decay function may be used to compute the lower scores.

Similarities between the IAM roles are then determined using the vectors. For example, the method may determine which data tables are commonly accessed by the IAM roles. If two IAM roles have accessed the same data tables in recent times (e.g., as given by the scores), then the IAM roles have a high similarity between them. Conversely, if two IAM roles have accessed different data tables in recent times, they have a lower similarity score. Alternatively, if the two IAM roles have accessed same data tables but at different times, there may be a moderate similarity between them. Generally, the similarity will be a function of how recent the data tables were accessed and how many are common to each IAM role.

The Pearson correlation, which is an example of a similarity score between two different IAM roles x and y is given by $$r_{xy} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

Alternatively, the Jaccards similarity between IAM roles A and B is given by:

$$J(A, B) = \frac{|A \cap B|}{|A \cup B|} = \frac{|A \cap B|}{|A| + |B| - |A \cap B|}$$

Additionally or alternatively, collaborative machine learning models may be used to determine the similarity between IAM roles. One example collaborative machine learning model includes the support vector machine (SVM). The above mathematical and machine learning models are just a few examples and should not be considered limiting. Any other mathematical model and/or machine learning model-based similarity should be considered within the scope of this disclosure.

At step 608, additional data tables of the given IAM role may be determined based on data tables accessed by the similar neighbor IAM roles. That is, the additional data tables include data tables that were not accessed by the given IAM roles, but accessed by similar IAM roles. Continuing with the above example, if iam_role2 and iam_role3 are found to be similar to iam_role1, the additional data tables may be selected from 60 data tables accessed by iam_role2 and 70 data tables accessed by iam_role3 (it should be understood that the additional data tables were not originally accessed by iam_role1).

At step 610, access privileges of the given IAM role to the accessed data tables and additional data tables may be kept while modifying access privileges to other data tables. For example, access privileges to the accessed data tables and the additional data tables may not be revoked, but the access privileges to the other data tables may be revoked.

The method 600 may be implemented at predetermined time intervals (e.g., daily, weekly, etc.) such that the access privileges can dynamically be changed based on the actual usage.

Figure 7:
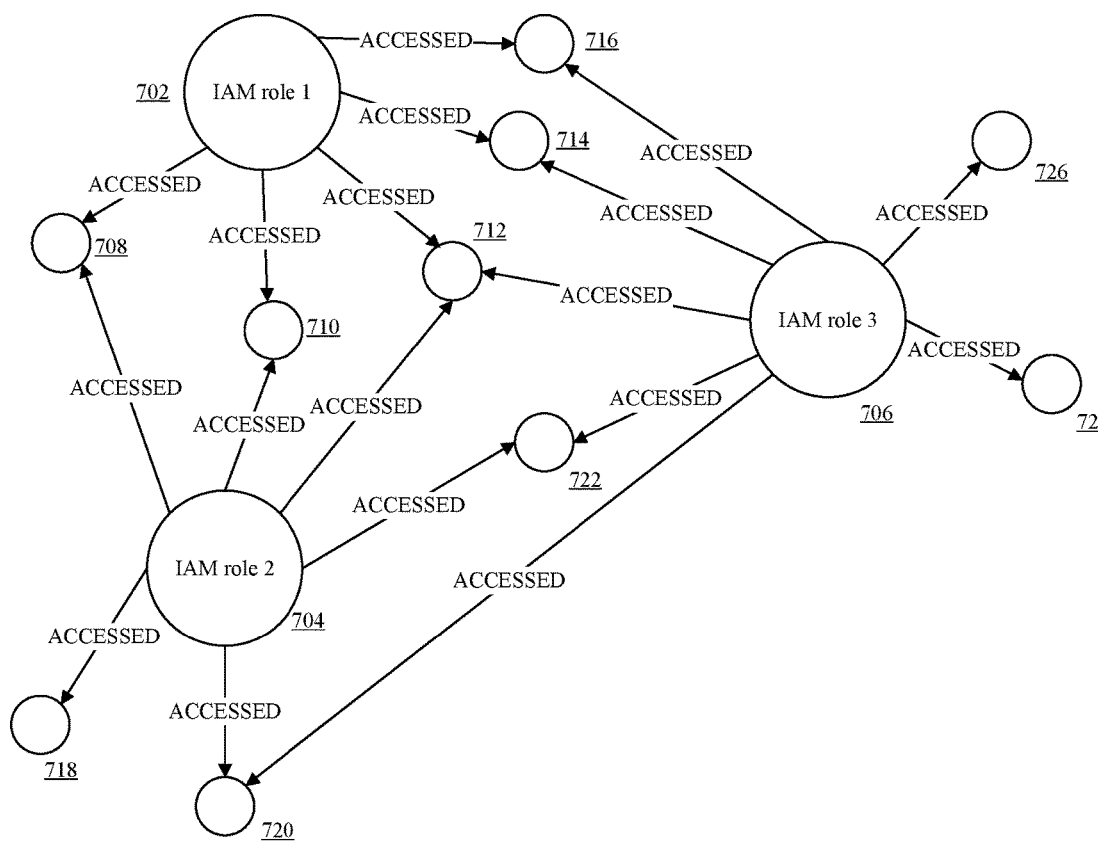
FIG. 7 shows a portion of graph based on observability metrics and user role access privileges, based on the principles disclosed herein.

FIG. 7 shows a portion 700 of graph based on observability metrics and user role access privileges, based on the principles disclosed herein. The shown portion 700 has three IAM roles: iam_role1 (node 702), iam_role2 (node 704), and iam_role3 (node 706). The other nodes show data tables (and will be referred to herein as data tables) that have been accessed by these IAM roles. It should, however, be understood that all IAM roles currently have access privileges to all of the shown data tables. However, as shown, iam_role1 (node 702) has accessed data tables 708, 710, 712, 714, 716, which form the baseline for the fine-tuned approach based on the principles disclosed herein. That is, at minimum, the access privileges for iam_role1 (node 702) has to be maintained for data tables 708, 710, 712, 714, 716.

But to avoid disruptions (e.g., iam_role1 pinging for access privileges if additional data tables are to be accessed), additional data tables are identified based on the similarity of iam_role1 (node 702) with each of iam_role2 (node 704) and iam_role3 (node 706). In the current example, it is presumed that iam_role1 (node 702) has been found similar each of iam_role2 (node 704) and iam_role3 (node 706) based on the principles disclosed herein. Then, the iam_role1 access privileges for the additional data tables 718, 720, 722, 724, 726 (not accessed by iam_role1 (node 702), but accessed by iam_role2 (node 704) and iam_role3 (node 706)) are maintained. Access privileges for the remaining data tables (not shown) may be revoked. In other words, the access privileges are fined-tuned based on the principle of least privilege access (i.e., provided access to what is needed as opposed to providing blanket access to everything.)

Figure 8:
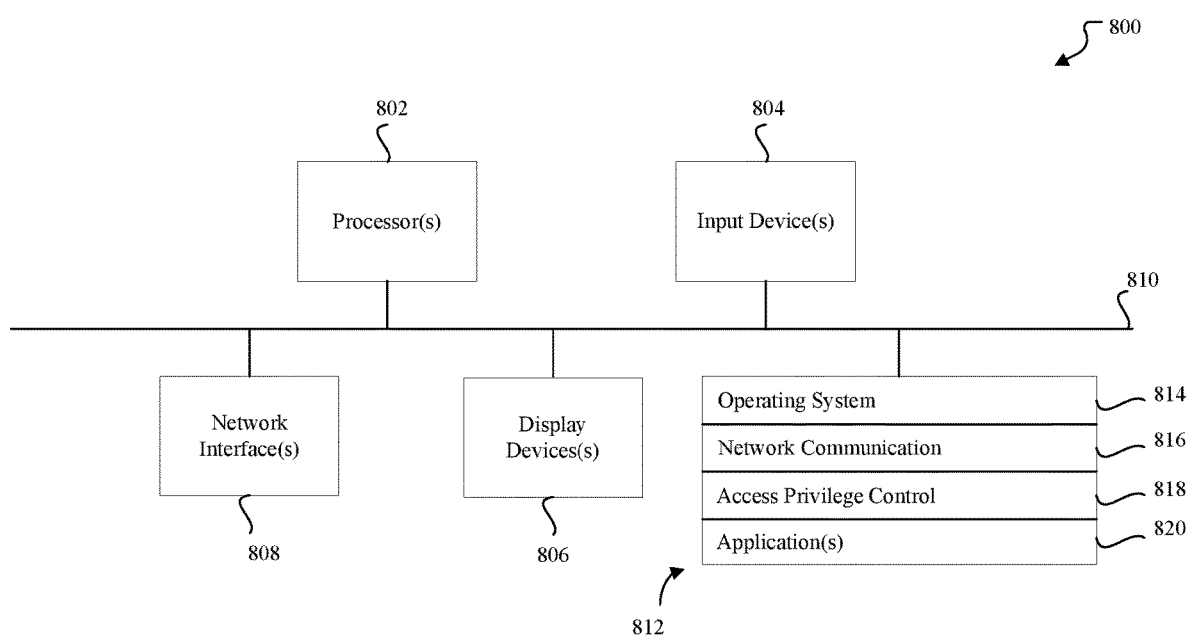
FIG. 8 shows a block diagram of an example computing device that implements various features and processes based on the principles disclosed herein.

FIG. 8 shows a block diagram of an example computing device 800 that implements various features and processes based on the principles disclosed herein. For example, computing device 800 may function as first server 120, second server 130, client 150*a*, client 150*b*, data lake 160 or a portion or combination thereof in some embodiments. The computing device 800 also performs one or more steps of the method 200. The computing device 800 is implemented on any electronic device that runs software applications derived from compiled instructions, including without limitation personal computers, servers, smart phones, media players, electronic tablets, game consoles, email devices, etc. In some implementations, the computing device 800 includes one or more processors 802, one or more input devices 804, one or more display devices 806, one or more network interfaces 808, and one or more computer-readable media 812. Each of these components is be coupled by a bus 810.

Display device 806 includes any display technology, including but not limited to display devices using Liquid Crystal Display (LCD) or Light Emitting Diode (LED) technology. Processor(s) 802 uses any processor technology, including but not limited to graphics processors and multi-core processors. Input device 804 includes any known input device technology, including but not limited to a keyboard (including a virtual keyboard), mouse, track ball, and touch-sensitive pad or display. Bus 810 includes any internal or external bus technology, including but not limited to ISA, EISA, PCI, PCI Express, USB, Serial ATA or FireWire. Computer-readable medium 812 includes any non-transitory computer readable medium that provides instructions to processor(s) 802 for execution, including without limitation, non-volatile storage media (e.g., optical disks, magnetic disks, flash drives, etc.), or volatile media (e.g., SDRAM, ROM, etc.).

Computer-readable medium 812 includes various instructions 814 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 804; sending output to display device 806; keeping track of files and directories on computer-readable medium 812; controlling peripheral devices (e.g., disk drives, printers, etc.) which can be controlled directly or through an I/O controller; and managing traffic on bus 810. Network communications instructions 816 establish and maintain network connections (e.g., software for implementing communication protocols, such as TCP/IP, HTTP, Ethernet, telephony, etc.).

Access privilege control 818 includes instructions that implement the disclosed embodiments for providing a fine-tuned access control in a data lake based on the principle of least privilege access.

Application(s) 820 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer-implemented method of controlling access to data tables in a data lake, the method comprising:
    generating an access graph based on current access policies, the access graph indicating current access privileges between a plurality of user roles, associated with a plurality of users, and a plurality of data tables;
    for a first user role associated with a first user and having current access privileges to a set of data tables of the plurality of data tables:
        analyzing access logs to the set of data tables to determine a first subset of data tables that were accessed using the first user role;
        identifying a predetermined number of additional user roles associated with additional users that have accessed at least a portion of the first subset of data tables;
        generating a second subset of data tables comprising the first subset of data tables and additional data tables accessed by the predetermined number of additional user roles; and
        maintaining access privileges of the first user role to the second subset of data tables, while revoking access privileges of the first user role to data tables of the plurality of data tables that are not included in the second subset of data tables.

2. The method of claim 1, wherein identifying the predetermined number of additional user roles comprises:
    identifying the predetermined number of user roles based on Pearson correlation between the first subset of data tables and data tables accessed by user accounts using the predetermined number of additional user roles.

3. The method of claim 1, wherein identifying the predetermined number of additional user roles comprises:
    identifying the predetermined number of user roles based on Jaccards similarity between the first subset of data tables and data tables accessed by user accounts using the predetermined number of additional user roles.

4. The method of claim 1, wherein identifying the predetermined number of additional user roles comprises:
    identifying the predetermined number of user roles based on using a collaborative filtering machine learning model on the first subset of data tables and data tables accessed by user accounts using the predetermined number of additional user roles.

5. The method of claim 1, the current access privileges indicating a coarse-grained data security protocol, the method further comprising:
    enforcing a fine-grained data security protocol by modifying the access privileges of the first user role to the data tables of the plurality of data tables that are not included in the second set of data tables.

6. The method of claim 1, wherein modifying the access privileges of the first user role comprises:
    modifying the access privileges of the first user role at predetermined time intervals based on analyzing additional access logs to additional data tables that were accessed by using the first user role.

7. The method of claim 1, wherein generating the access graph comprises:
    generating the current access policies by aggregating current access policies associated with the plurality of user roles and current access policies associated with the plurality of data tables.

8. The method of claim 1, wherein generating the access graph based on the current access policies comprises:
    generating the access graph based on current access policies associated with the plurality of user roles and current access policies associated with the plurality of data tables.

9. The method of claim 1, wherein generating the access graph comprises:
    generating the access graph that comprises one user role having access privileges to multiple data tables and one data table providing access privileges to multiple user roles.

10. A system comprising:
    a non-transitory storage medium storing computer program instructions; and
    a processor configured to execute the computer program instructions to cause operations comprising:
        generating an access graph based on current access policies, the access graph indicating current access privileges between a plurality of user roles, associated with a plurality of users, and a plurality of data tables;
        for a first user role having current access privileges to a set of data tables of the plurality of data tables:

analyzing access logs to the set of data tables to determine a first subset of data tables that were accessed using the first user role;

identifying a predetermined number of additional user roles associated with additional users that have accessed at least a portion of the first subset of data tables;

generating a second subset of data tables comprising the first subset of data tables and additional data tables accessed by the predetermined number of additional user roles; and maintaining access privileges of the first user role to the second subset of data tables, while revoking access privileges of the first user role to data tables of the plurality of data tables that are not included in the second subset of data tables.

11. The system of claim 10, wherein identifying the predetermined number of additional user roles comprises:
identifying the predetermined number of user roles based on Pearson correlation between the first subset of data tables and data tables accessed by user accounts using the predetermined number of additional user roles.

12. The system of claim 10, wherein identifying the predetermined number of additional user roles comprises:
identifying the predetermined number of user roles based on Jaccards similarity between the first subset of data tables and data tables accessed by user accounts using the predetermined number of additional user roles.

13. The system of claim 10, wherein identifying the predetermined number of additional user roles comprises:
identifying the predetermined number of user roles based on using a collaborative filtering machine learning model on the first subset of data tables and data tables accessed by user accounts using the predetermined number of additional user roles.

14. The system of claim 10, the current access privileges indicating a coarse-grained data security protocol, the operations further comprising:
enforcing a fine-grained data security protocol by modifying the access privileges of the first user role to the data tables of the plurality of data tables that are not included in the second set of data tables.

15. The system of claim 10, wherein modifying the access privileges of the first user role comprises:
modifying the access privileges of the first user role at predetermined time intervals based on analyzing additional access logs to additional data tables that were accessed using the first user role.

16. The system of claim 10, wherein generating the access graph comprises:
generating the current access policies by aggregating current access policies associated with the plurality of user roles and current access policies associated with the plurality of data tables.

17. The system of claim 10, wherein generating the access graph based on the current access policies comprises:
generating the access graph based on current access policies associated with the plurality of user roles and current access policies associated with the plurality of data tables.

18. The system of claim 10, wherein generating the access graph comprises:
generating the access graph that comprises one user role having access privileges to multiple data tables and one data table providing access privileges to multiple user roles.

* * * * *